US008181001B2

(12) United States Patent
Gonion et al.

(10) Patent No.: US 8,181,001 B2
(45) Date of Patent: *May 15, 2012

(54) CONDITIONAL DATA-DEPENDENCY RESOLUTION IN VECTOR PROCESSORS

(75) Inventors: Jeffry E. Gonion, Campbell, CA (US); Keith E. Diefendorff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/237,212

(22) Filed: Sep. 24, 2008

(65) Prior Publication Data

US 2010/0077183 A1  Mar. 25, 2010

(51) Int. Cl.
G06F 9/45 (2006.01)
(52) U.S. Cl. ........................ 712/216; 717/150
(58) Field of Classification Search .................. None
See application file for complete search history.

(56) References Cited

U.S. PATENT DOCUMENTS

| | | | |
|---|---|---|---|
| 5,349,692 A * | 9/1994 | Nishi ................................. 712/9 |
| 5,381,536 A | 1/1995 | Phelps |
| 5,499,350 A * | 3/1996 | Uchida et al. ................. 712/220 |
| 5,781,752 A | 7/1998 | Moshovos |
| 5,802,375 A * | 9/1998 | Ngo et al. ...................... 717/160 |
| 5,953,241 A | 9/1999 | Hansen |
| 6,044,222 A * | 3/2000 | Simons et al. ................. 717/156 |
| 6,115,808 A | 9/2000 | Arora |
| 6,295,599 B1 | 9/2001 | Hansen |
| 6,308,250 B1 | 10/2001 | Klausler |
| 6,308,259 B1 * | 10/2001 | Witt ............................. 712/214 |
| 6,571,386 B1 * | 5/2003 | Figurin et al. ................. 717/154 |
| 6,584,482 B1 | 6/2003 | Hansen |
| 6,643,765 B1 | 11/2003 | Hansen |
| 6,725,356 B2 | 4/2004 | Hansen |
| 6,993,756 B2 * | 1/2006 | Ogawa et al. .................. 717/159 |
| 7,194,606 B2 * | 3/2007 | Bhushan et al. ............... 712/226 |
| 7,213,131 B2 | 5/2007 | Hansen |
| 7,216,217 B2 | 5/2007 | Hansen |
| 7,260,708 B2 | 8/2007 | Hansen |
| 7,301,541 B2 | 11/2007 | Hansen |
| 7,321,369 B2 * | 1/2008 | Wyatt et al. .................... 345/556 |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |

(Continued)

OTHER PUBLICATIONS

Beletshyy, V., A Correction Method for Parallel Loop Execution, 2002, Springer-Verlag pp. 409-418.*

(Continued)

*Primary Examiner* — Eric Coleman
(74) *Attorney, Agent, or Firm* — Park, Vaughan, Fleming & Dowler LLP; Steven E. Stupp

(57) ABSTRACT

Described is a method for performing parallel operations in a computer system when one or more conditional dependencies may be present, where a given conditional dependency includes a dependency associated with at least two data elements based on a pair of conditions. During operation, a processor receives instructions for generating a vector of tracked positions of actual dependencies, where a given tracked position indicates the position of a given actual dependency, and where the given actual dependency occurs when the pair of condition matches one or more criteria. Then, the processor executes the instructions for generating the vector of tracked positions.

24 Claims, 8 Drawing Sheets

U.S. PATENT DOCUMENTS

| | | | |
|---|---|---|---|
| 7,571,301 B2* | 8/2009 | Kejariwal et al. | 712/215 |
| 7,653,806 B2 | 1/2010 | Hansen | |
| 7,660,972 B2 | 2/2010 | Hansen | |
| 7,660,973 B2 | 2/2010 | Hansen | |
| 7,712,091 B2* | 5/2010 | Muthukumar et al. | 717/150 |
| 7,730,287 B2 | 6/2010 | Hansen | |
| 2002/0144098 A1* | 10/2002 | Wang et al. | 712/221 |
| 2004/0230960 A1* | 11/2004 | Nair et al. | 717/140 |
| 2007/0169059 A1* | 7/2007 | Halambi et al. | 717/160 |

OTHER PUBLICATIONS

Pugh, William, The Omega Test: a fast and practical integer programming algorithm for dependence analysis, 1991 ACM, pp. 4-13.*

Goff, G, etal., Practical Dependence Testing, 1991, ACM, Proc. of the ACM SIGPLAN 91' Conf. on Prog. Lang. Design and implementations pp. 15-29.*

Callahan, D. etal., Analysis of Event Synchronization in a Parallel Programming Tool, 1990, ACM pp. 21-30.*

* cited by examiner

┌─ 230

┌─────────────────────────────────────────────────────────────────────────┐
│ RECEIVE INSTRUCTIONS FOR GENERATING ONE OR MORE STOP INDICATORS BASED  │
│   ON ACTUAL DEPENDENCIES, WHERE A GIVEN STOP INDICATOR INDICATES THE   │
│     POSITION OF A GIVEN ACTUAL DEPENDENCY THAT CAN LEAD TO DIFFERENT   │
│   RESULTS WHEN THE DATA ELEMENTS ARE PROCESSED IN PARALLEL THAN WHEN   │
│     THE DATA ELEMENTS ARE PROCESSED SEQUENTIALLY, AND WHERE THE GIVEN  │
│    ACTUAL DEPENDENCY OCCURS WHEN THE PAIR OF CONDITIONS MATCHES ONE OR │
│                              MORE CRITERIA                             │
│                                   240                                  │
└─────────────────────────────────────────────────────────────────────────┘
                                       │
                                       ▼
┌─────────────────────────────────────────────────────────────────────────┐
│  EXECUTE THE INSTRUCTIONS FOR GENERATING THE ONE OR MORE STOP INDICATORS│
│                                   242                                  │
└─────────────────────────────────────────────────────────────────────────┘

FIG. 2B

P1 = A[x] < K;                              {0,0,1,1,1,0,0,0}
P2 = ConditionalStop(P1, MODE);             {0,0,0,1,1,1,0,0}
P3 = GeneratePredicates(P3, P2);            (varies)

P3 = {1,1,1,0,0,0,0,0}                      // 1st pass predicate generation
P3 = {0,0,0,1,0,0,0,0}                      // 2nd pass predicate generation
P3 = {0,0,0,0,1,0,0,0}                      // 3rd pass predicate generation
P3 = {0,0,0,0,0,1,1,1}                      // 4rd pass predicate generation

FIG. 3

P1 = A[x] < K;                              {0,0,1,1,1,0,0,0}
P2 = ConditionalStopIndex(P1, MODE);        {0,0,0,3,4,5,0,0}
P3 = GeneratePredicatesIndex(P3, P2);       (varies)

P3 = {1,1,1,0,0,0,0,0}                      // 1st pass predicate generation
P3 = {0,0,0,1,0,0,0,0}                      // 2nd pass predicate generation
P3 = {0,0,0,0,1,0,0,0}                      // 3rd pass predicate generation
P3 = {0,0,0,0,0,1,1,1}                      // 4th pass predicate generation

FIG. 4 v0 = ...                         {0,1,2,3,4,5,6,7,8};
p0 = ...                         {0,0,0,1,1,1,0,0,0};
v1 = PropagatePrior(v0, p0);     {0,1,2,2,2,2,6,7,8};
p1 = ...                         {1,1,1,0,0,0,0,0,0}
v2 = PropagatePrior(v0, p1);     {8,8,8,3,4,5,6,7,8};

FIG. 5 v0 = ...                         {0,1,2,3,4,5,6,7,8};
p0 = ...                         {0,0,0,1,1,1,0,0,0};
v1 = PropagatePost(v0, p0);      {0,1,2,3,4,5,5,5,5};

FIG. 6

CONDITIONAL DATA-DEPENDENCY RESOLUTION IN VECTOR PROCESSORS

CROSS REFERENCE TO RELATED APPLICATIONS

This application is also related to pending U.S. patent application Ser. No. 12/237,196, filed on Sep. 24, 2008, entitled "Generating Stop Indicators Based on Conditional Data Dependency In Vector Processors," and to pending U.S. patent application Ser. No. 12/237,190, filed on Sep. 24, 2008, entitled "Generating Predicate Values Based on Conditional Data Dependency in Vector Processors," each of which are herein incorporated by reference.

BACKGROUND

1. Field of the Invention

The present invention generally relates to techniques for improving computer system performance. More specifically, the present invention relates to instructions that prevent structural hazards associated with conditional data dependencies during vector or parallel-processing operations.

2. Related Art

There are many impediments to the parallelization of computational operations in parallel-processing systems. Among these impediments are data dependencies, such as data dependencies that carry across iterations of a loop (which are sometimes referred to as loop-carried dependencies). In existing parallel processing systems, it is typically assumed that loops that include loop-carried dependencies cannot be vectorized or implemented in parallel unless the dependencies are predictable, such as the value of a loop-index variable.

In existing computer systems, a compiler may identify loop-carried dependencies that are related to the structure of the code and that can be determined when the code is compiled, which are henceforth referred to as structural hazards. (Note that these structural hazards are distinct from memory hazards, such as address hazards, in which different memory references refer to the same address.) Typically, structural hazards are conditional in nature, i.e., a loop-carried dependency may or may not arise because the loop-carried dependency may depend on the state of a condition variable. Because the state of the condition variable cannot be known when the code is compiled, the compiler typically takes the most conservative approach and does not vectorize in the presence of a possible loop-carried dependency, even though the loop-carried dependency may never actually occur.

Hence, what is needed is a technique to facilitate vector or parallel processing in the presence of structural hazards without the above-described problems.

SUMMARY

One embodiment of the present invention provides a method for performing parallel operations in a computer system when one or more conditional dependencies may be present, where a given conditional dependency includes a dependency associated with at least two data elements based on a pair of conditions. During operation, a processor receives instructions for generating a vector of tracked positions of actual dependencies, where a given tracked position indicates the position of a given actual dependency, and where the given actual dependency occurs when the pair of condition matches one or more criteria. Then, the processor executes the instructions for generating the vector of tracked positions.

In some embodiments, the at least two data elements are adjacent to each other in a vector of conditions.

In some embodiments, the one or more criteria include true-true, true-false, false-true or false-false pairings between elements.

In some embodiments, the dependency includes another operation that is related to the at least two data elements. Moreover, results of the other operation may be different when evaluated in parallel than when evaluated sequentially.

In some embodiments, the pair of conditions is associated with logical operations. For example, the pair of conditions may be determined by evaluating one or more true/false conditions.

In some embodiments, the given tracked position is associated with a change in the pair of conditions or an absence of a change in the pair of conditions.

Another embodiment provides the processor, which includes an instruction fetch unit configured to fetch instructions corresponding to at least some of the preceding operations, and an execution unit configured to execute the instructions.

Another embodiment provides a computer system that includes the processor.

Another embodiment provides a compiler configured to generate instructions corresponding to at least some of the preceding operations based on a feature set of a processor.

BRIEF DESCRIPTION OF THE FIGURES

FIG. 2B is a flow chart illustrating a process for performing parallel operations in a computer system when one or more structural hazards may be present.

FIG. 3 illustrates a process for generating stop indicators and predicate values in accordance with an embodiment of the present invention.

FIG. 4 illustrates a process for generating stop indicators and predicate values in accordance with an embodiment of the present invention.

FIG. 5 illustrates a process for generating predicate values in accordance with an embodiment of the present invention.

FIG. 6 illustrates a process for generating predicate values in accordance with an embodiment of the present invention.

Figure 1A:
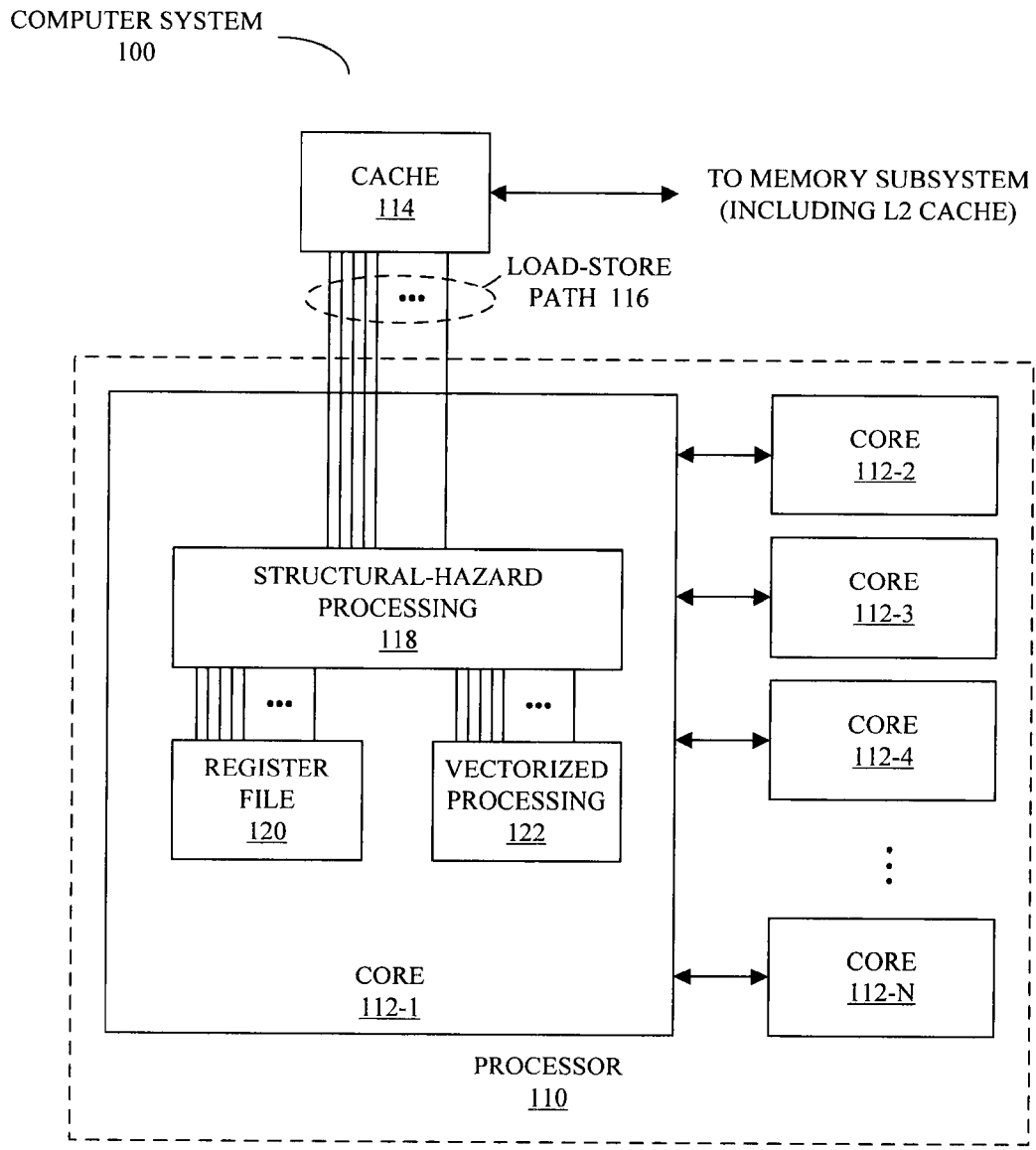
FIG. 1A is a block diagram illustrating a computer system in accordance with an embodiment of the present invention.

Table 1 provides pseudo-code in accordance with an embodiment of the present invention.

Table 2 provides pseudo-code in accordance with an embodiment of the present invention.

Table 3 provides pseudo-code in accordance with an embodiment of the present invention.

Table 4 provides pseudo-code in accordance with an embodiment of the present invention.

Table 5 provides pseudo-code in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of a processor, a computer system, a compiler, and a technique that facilitate parallel or vector processing in the presence of structural hazards are described. In particular, these devices, systems, and/or techniques may be used to mitigate or cope with the effects of structural hazards (when present) in a variety of environments, including: data-level-parallelism (DLP) machines, autovectorizing compilers, fine-grain threaded processors, and/or autothreading compilers. As noted previously, structural hazards are associated with loop-carried dependencies that are related to the structure of the code that may produce different results when associated operations are evaluated in parallel than when these operations are performed sequentially.

In some embodiments, the structure of the code may include one or more conditional dependencies associated with the vector, where a given conditional dependency is associated with a loop-carried dependency of a state for a condition for elements in the vector when the condition is evaluated for the elements in parallel. For example, the condition may be one or more logical operations or comparisons (such as a true/false condition) that are included in a loop. Moreover, one or more stop indicators and/or one or more predicate values may be generated based on the conditional dependencies associated with the vector.

These techniques may be applied in macroscalar-class processors or microprocessors (which allow multiple iterations of a loop to execute in parallel, where the degree of parallelization is determined at run-time) and/or vector-style macroscalar processors or microprocessors (in which the effective vector length is changed dynamically, either by means of a variable vector length, or through predication of operations on certain elements of the vector).

By providing mechanisms to guarantee correct program execution in the presence of possible structural hazards, and by using the techniques described below, processors, microprocessors, and/or autovectorizing compilers may be better able to use code optimization techniques (such as parallel or vector processing) even in the presence of dynamic program behavior. In particular, these techniques may prevent vector elements from being processed in parallel when a loop-carried dependency occurs, and may allow vector elements to be processed in parallel when the loop-carried dependency does not occur.

Note that the data structures and code described in this detailed description are typically stored on a computer-readable storage medium, which may be any device or medium that can store code and/or data for use by a computer system. This includes, but is not limited to: volatile memory, non-volatile memory, magnetic and optical storage devices such as disk drives, magnetic tape, CDs (compact discs), DVDs (digital versatile discs or digital video discs), and/or other media capable of storing computer-readable media now known or later developed.

We now describe embodiments of a computer system that includes one or more processors. FIG. 1A presents a block diagram illustrating a computer system 100 in accordance with an embodiment of the present invention. Computer system 100 may generally include any type of computer system, including, but not limited to: a computer system based on a processor or microprocessor, a mainframe computer, a digital signal processor, a portable computing device, a personal organizer, a device controller, a cell phone, and/or a computational engine within an appliance.

Computer system 100 includes a processor 110, such as a central-processing unit (CPO), which performs computational operations. While performing these computational operations, processor 110 operates on data items retrieved from cache memory 114 via a load-store path 116. Note that cache memory 114 is coupled to a memory subsystem (not illustrated). In one embodiment of the present invention, cache memory 114 is a Level-One (L1) data cache which communicates with a memory subsystem that includes a Level-Two (L2) unified instruction/data cache and a main memory.

Processor 110 includes multiple cores 112. One or more of these cores 112 may include structural-hazard processing module 118 (for example, in an execution unit), which executes instructions for generating one or more stop indicators and/or one or more predicate values during the processing of a vector or a portion of a vector that is associated with a conditional dependency, such as a loop-carried dependency of a state for a condition for elements in the vector or the portion of the vector (e.g., a partial vector). For example, the condition may be a logical operation or comparison (such as a true/false condition) that is included in a loop. Note that a given stop indicator and/or a given predicate value may be associated with a change in the condition.

Moreover, the one or more stop indicators and/or one or more predicate values may be generated when software is compiled and/or at run-time when the associated code is executed. In some embodiments, the one or more stop indicators and/or the one or more predicate values may be identified for multiple vectors or portions of vectors concurrently or independently of one another.

Note that the one or more predicate values may define how to partition the vector or the partial vector. For example, one or more sets of continuous elements in the vector or the portion of the vector may be processed in parallel based on the predicate values. Note that a register file 120 may hold the stop indicators, the predicate vectors, and operands that are to be processed by functional units within the processor 110 and/or core 112-1.

Figure 1B:
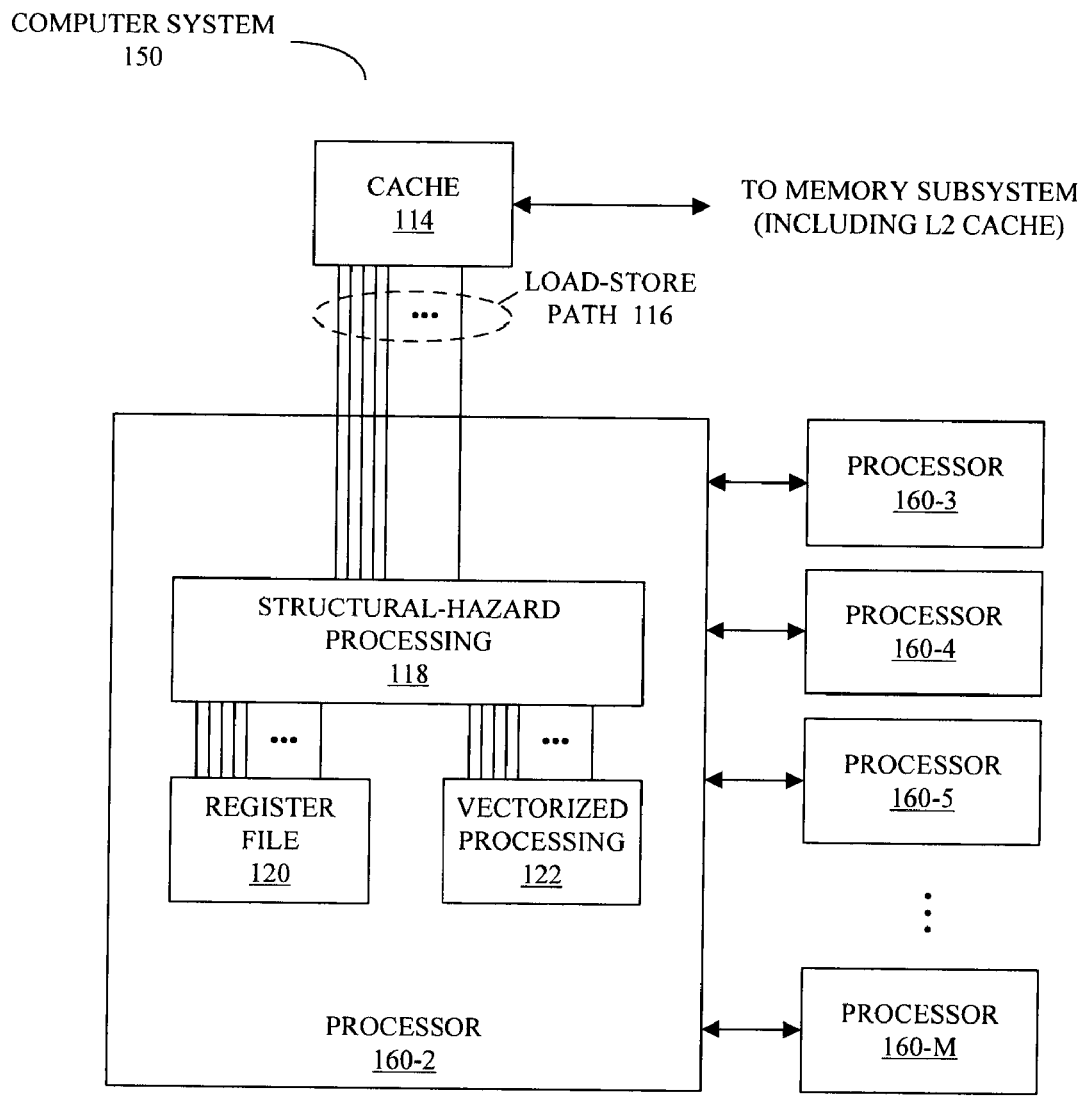
FIG. 1B is a block diagram illustrating a computer system in accordance with an embodiment of the present invention.

Furthermore, vector processing module 122 may assign portions of the vector to one or more of the cores 112 for processing. In some embodiments, this processing is implemented using multiple processors. This is illustrated in FIG. 1B, which presents a computer system 150 that includes processors 160.

Note that while the computer system 100 (FIG. 1A) and/or the computer system 150 are illustrated as having a number of components in a given configuration, in other embodiments the computer system 100 (FIG. 1A) and/or the computer system 150 include fewer components or additional components. Moreover, two or more components may be combined into a single component and/or a position of one or more components may be changed. For example, in some embodiments the techniques described below are implemented within existing modules in processor 110 (FIG. 1A) and/or processors 160.

Figure 2A:
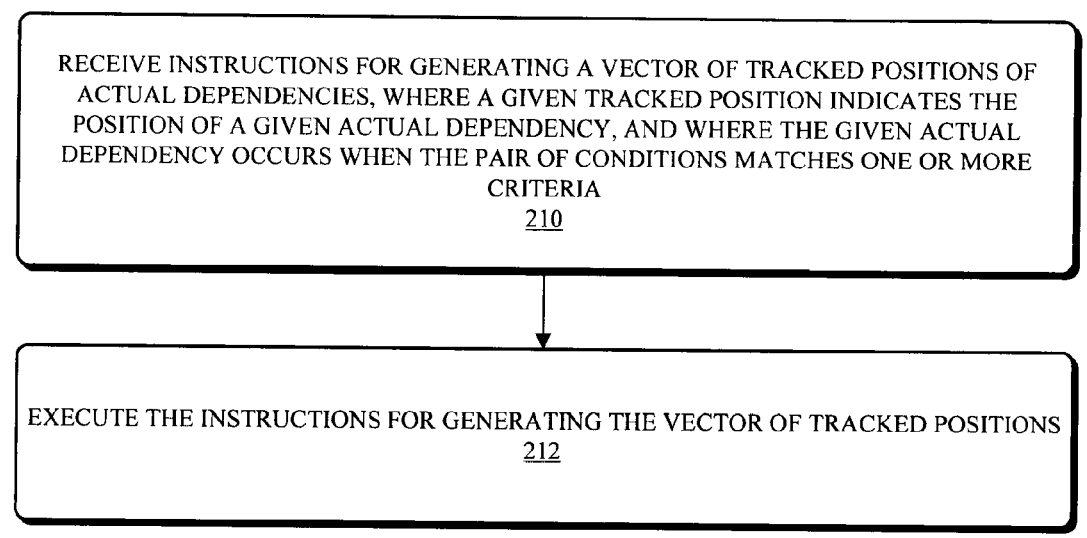
FIG. 2A is a flow chart illustrating a process for performing parallel operations in a computer system when one or more structural hazards may be present.

We now describe embodiments of a method for performing parallel operations in the computer system when one or more structural hazards may be present. FIG. 2A is a flow chart illustrating a process 200 for performing parallel operations in a computer system when one or more conditional dependencies may be present, where a given conditional dependency includes a dependency associated with at least two data elements based on a pair of conditions. During operation, a processor receives instructions for generating a vector of tracked positions of actual dependencies (210), where a given tracked position indicates the position of a given actual dependency, and where the given actual dependency occurs when the pair of conditions matches one or more criteria. Then, the processor executes the instructions for generating the vector of tracked positions (212).

FIG. 2B is a flow chart illustrating a process 230 for performing parallel operations in a computer system when one or more conditional dependencies may be present, where a given conditional dependency includes a dependency associated with at least two data elements based on a pair of conditions. During operation, a processor receives instructions for generating one or more stop indicators based on actual dependencies (240), where a given stop indicator indicates the position of a given actual dependency that can lead to different results when the data elements are processed in parallel than when the data elements are processed sequentially, and where the given actual dependency occurs when the pair of conditions matches one or more criteria. Then, the processor executes the instructions for generating the one or more stop indicators (242).

Figure 2C:
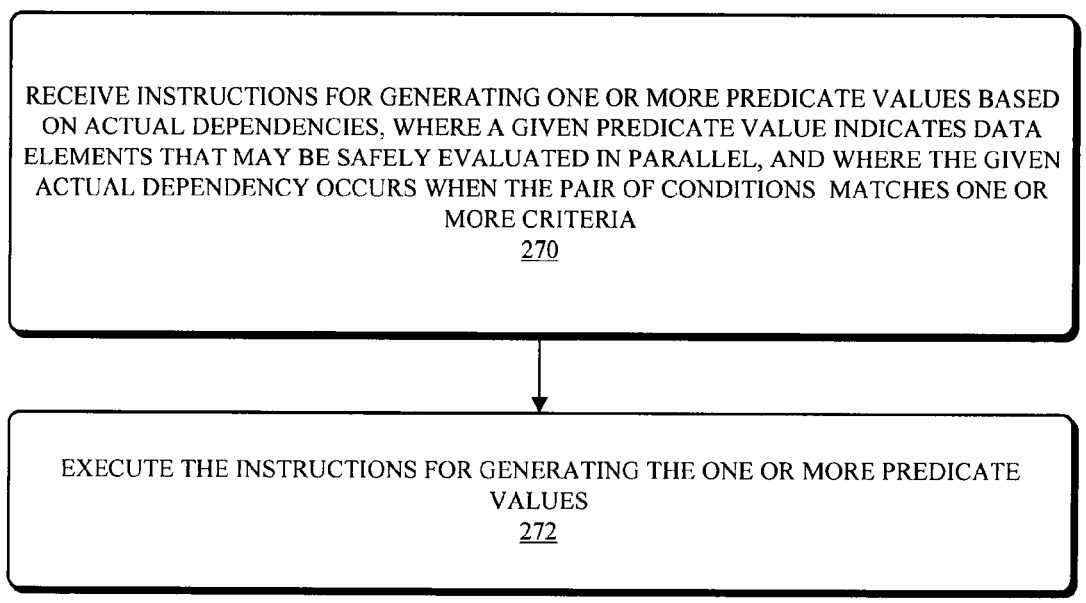
FIG. 2C is a flow chart illustrating a process for performing parallel operations in a computer system when one or more structural hazards may be present.

FIG. 2C is a flow chart illustrating a process 260 for performing parallel operations in a computer system when one or more conditional dependencies may be present, where a given conditional dependency includes a dependency associated with at least two data elements based on a pair of conditions. During operation, a processor receives instructions for generating one or more predicate values based on actual dependencies (270), where a given predicate value indicates data elements that may be safely evaluated in parallel, and where the given actual dependency occurs when the pair of conditions matches one or more criteria. Then, the processor executes the instructions for generating the one or more predicate values (272).

Note that in some embodiments of the processes 200 (FIG. 2A), 230 (FIG. 2B) and/or 260 there may be additional or fewer operations. Moreover, the order of the operations may be changed and/or two or more operations may be combined into a single operation.

We now describe embodiments that generate one or more stop indicators or one or more predicate values. These stop indicators or predicate values may permit vectorization in the presence of potential data dependencies that can cause loop-carried dependencies. In particular, the stop indicators or predicate values may prevent vector elements from being processed in parallel when a loop-carried dependency occurs, and may allow vector elements to be processed in parallel if a loop-carried dependency does not occur.

In particular, given a vector of true/false conditions, one or more loop-carried dependencies may be dependent upon the state of the condition at each element position in the vector. Consider the pseudo-code shown in Table 1. In this example, the variable j has a loop-carried dependency only while the condition is true (i.e., while A[x]<j). If this condition is false, multiple elements may be processed in parallel until the condition becomes true. However, while the condition is true, elements must be processed sequentially.

TABLE 1

```
j = 0;
for (x=0; x<100; ++x)
    if (A[x] < K)
        j = A[x + j];
    B[x] = j;
```

Conventional wisdom dictates that the variable j always has a loop-carried dependency, because a given iteration of the loop depends on the value of j calculated in some previous iteration of the loop. However, in this example, it is clear that the variable j may not always be updated. This allows optimization, because when the variable j is not updated it is predictable (i.e., its value is whatever it was during the previous iteration).

This predictability of the loop-carried dependency allows multiple iterations of a loop to be executed simultaneously, if there is a mechanism available to expose this opportunity to the compiler. In particular, a vector of conditions can be analyzed to determine which corresponding vector elements may be processed in parallel, and which must be processed serially. This may be accomplished by selecting a pre-determined technique at compile time. Note that the selected technique may depend on the structure of the code and the data dependencies.

In principle, there are 16 possible techniques based on four conditions or conditional features. If a true state of the condition depends on a true state, elements for which the condition is true may not be processed in parallel with other elements for which the condition is true. Thus, while the condition is true, a loop-carried dependency exists that should disable parallel processing of elements.

If a false state of the condition depends on a false state, elements for which the condition is false may not be processed in parallel with other elements for which the condition is false. Thus, while the condition is false, a loop-carried dependency exists that should disable parallel processing of elements.

If a false state of the condition depends on a true state, elements for which the condition is false may not be processed in parallel with elements for which the condition is true. Moreover, if a true state of the condition depends on a false state, elements for which the condition is true may not be processed in parallel with elements for which the condition is false.

Note that in some embodiments these four conditions or conditional features may be expressed as transitions or changes in the state of the condition that are safe to execute in parallel, rather than transitions where it is unsafe to do so.

Collectively, these conditional features enumerate 16 possible techniques that may be applied to a vector of conditions to determine where parallelism between corresponding elements should be broken because of the presence of a structural hazard. In particular, in the first of the preceding examples, if the condition is true, subsequent iterations of the loop (and therefore subsequent elements) will have a loop-carried dependency on the iteration for which the condition is true. This corresponds to the following conditional features: if a true state of the condition depends on a true state, elements for which the condition is true may not be processed in parallel; and if a false state of the condition depends on a true state, elements for which the condition is false may not be processed in parallel with elements for which the condition is true. Note that the following conditional features are not present in this example: if a false state depends on a false state, elements for which the condition is false may be processed in parallel with other elements for which the corresponding condition is false; and if a true state depends on a false state, elements for which the condition is true may be processed in parallel with previous elements for which the corresponding condition is false.

For example, the condition 'A[x]<K' in Table 1 may evaluate to the following array of values when vectorized:

P1={F,F,T,T,T,F,F,F}.

Note that transitions or changes in the state of the condition mentioned previously refer to a left-to-right evaluation of the condition. In other embodiments, another version of the transitions or changes in the state of the condition may be determined based on right-to-left evaluation of the condition.

We now describe several instructions that may be implemented by a processor. A ConditionalStop instruction may analyze an input vector with respect to a given mode of operation, and may produce stop indicators that indicate where parallel vector computations should be broken into sequential parts to maintain program correctness. In the following example, the stop indicators specify whether an element may be computed in parallel with the element to the immediate left. In other embodiments, a version of the ConditionalStop instruction generates stop indicators that specify whether an element may be computed in parallel with the element to the immediate right. Note that the mode of operation may correspond to the 1-of-16 techniques or combinations of the four conditional features that the program structure and data dependencies exhibit.

Stop indicators produced by the ConditionalStop instruction may be used to produce predicate values that specify which elements of the vector will be operated upon, thereby breaking parallelism between elements indicated by the stop indicators. Moreover, the remaining instructions in the loop in Table 1 may be handled according to the set of conditions in the vector P1. If these conditions correspond to x values from 0 to 7, loop iterations 0-2 may be processed in parallel, loop iterations 3 and 4 may be processed sequentially, and loop iterations 5-7 may also be processed in parallel. This is shown in FIG. 3, which illustrates a process for generating stop indicators and predicate values.

Note that the process illustrated in FIG. 3 allows the code to achieve the greatest amount of parallelism possible given the actual loop-carried dependencies. This is illustrated in the instructions in Table 2, which presents pseudo-code showing data flow and the generating of predicate values for eight iterations of the loop after vectorization (where one pass over the loop body corresponds to eight iterations).

TABLE 2

| | |
|---|---|
| tt = A[x{0..7}]; | // Active elements = {1,1,1,1,1,1,1,1} |
| P1{0..7} = A[x{0..7}] < K; | // Active elements = {1,1,1,1,1,1,1,1} |
| ... | // Active elements = {1,1,1,0,0,0,0,0} |
| j{2} = A[x{2} + j{2}]; | // Predicated on P1 = {0,0,1,0,0,0,0,0} |
| j{3} = A[x{3} + j{3}]; | // Active elements = {0,0,0,1,0,0,0,0} |
| j{4} = A[x{4} + j{4}]; | // Active elements = {0,0,0,0,1,0,0,0} |
| j{5,6,7} = j{4}; | // Active elements = {0,0,0,0,0,1,1,1} |
| B[x{0..7}] = j{0..7}; | // Active elements = {1,1,1,1,1,1,1,1} |
| j{0..7} = j{7}; | // Active elements = {1,1,1,1,1,1,1,1} |
| | // (Housekeeping for next pass) |

A ConditionalStopIndex instruction analyzes the input predicate values with respect to a given mode of operation and produces a vector of indices that indicate where parallel vector computations may be broken into sequential parts to maintain program correctness. In the following example, the indices indicate the highest element number that cannot be processed in parallel with the element in the vector that the index number resides in. Moreover, a '0' indicates that a particular element may be processed in parallel with any number of lower-numbered elements. (In other embodiments, ConditionalStopIndex is defined from right-to-left instead of from left-to-right.) In practice, this number may be negative or any other suitable value that differentiates it from a valid element number. Note that the mode of operation may correspond to the 1-of-16 techniques or combinations of the four conditional features that the program structure and data dependencies exhibit.

In some embodiments, the ConditionalStopIndex instruction leads to index results that allow efficient combination with other forms of parallelism-breaking analysis instructions, such as a check for a memory hazard. Moreover, the indices produced by the ConditionalStopIndex instruction may be used to produce predicate values that specify which elements of the vector will be operated upon, thereby breaking parallelism between elements indicated by the stop indicators.

Note that the remaining instructions in the loop in Table 1 may be handled according to the set of conditions in the vector P1. If these conditions correspond to x values from 0 to 7, loop iterations 0-2 may be processed in parallel, loop iterations 3 and 4 must be processed sequentially, and loop iterations 5-7 may be processed in parallel. This is shown in FIG. 4, which illustrates a process for generating stop indicators and predicate values.

Moreover, note that the process illustrated in FIG. 4 allows the code to achieve the greatest amount of parallelism possible under the conditions. This is illustrated in the instructions in Table 3, which presents pseudo-code showing data flow and the generating of predicate values for eight iterations of the loop after vectorization (where one pass over the loop body corresponds to eight iterations).

TABLE 3

| | |
|---|---|
| tt = A[x{0..7}]; | // Active elements = {1,1,1,1,1,1,1,1} |
| P1{0..7} = A[x{0..7}] < K | // Active elements = {1,1,1,1,1,1,1,1} |
| ... | // Active elements = {1,1,1,0,0,0,0,0} |
| j{2} = A[x{2} + j{2}]; | // Predicated on P1 = {0,0,1,0,0,0,0,0} |
| j{3} = A[x{3} + j{3}]; | // Active elements = {0,0,0,1,0,0,0,0} |
| j{4} = A[x{4} + j{4}]; | // Active elements = {0,0,0,0,1,0,0,0} |
| j{5,6,7} = j{4}; | // Active elements = {0,0,0,0,0,1,1,1} |
| B[x{0..7}] = j{0..7}; | // Active elements = {1,1,1,1,1,1,1,1} |
| j{0..7} = j{7}; | // Active elements = {1,1,1,1,1,1,1,1} |
| | // (Housekeeping for next pass) |

A PropagatePrior instruction propagates values across a vector. This instruction takes a data vector and a vector of predicate values as inputs. In this instruction, the data element at the position corresponding to the first active predicate-value position takes the value of the prior element, and this value is copied to subsequent positions corresponding to contiguous active predicate values. In particular, if the first element in the predicate value is active, the value propagated is the value at the last element of the data vector. FIG. 5 presents a process for generating predicate values using the PropagatePrior instruction. Note that this instruction allows elements corresponding to iterations for which a variable is not updated to copy the previous value of the variable from a prior iteration.

Similarly, a PropagatePost instruction propagates values across a vector. This instruction takes a data vector and a vector of predicate values as inputs. In this instruction, the data element at the position corresponding to the last active predicate-value position is copied to subsequent positions corresponding to contiguous inactive predicate values. FIG. 6 presents a process for generating predicate values using the PropagatePost instruction. Note that this instruction allows elements corresponding to iterations for which a variable is not updated to copy the previous value of the variable from the current iteration.

We now describe an exemplary embodiment based on the loop shown in Table 1. Table 4 presents pseudo-code for a scalar implementation of this loop. In contrast, pseudo-code for a macroscalar implementation of the loop is shown in Table 5. Note that the fewer data samples that pass the test A[x]<K, the greater the performance advantage the macroscalar code will have. For example, for a randomly distributed array of 1000 numbers, where 10% of the data samples pass this test, the scalar version of the loop executes 7220 instructions, while the macroscalar version executes only 2822 instructions. However, what is less obvious is that when 100% of the data samples pass this test, the macroscalar version of the loop still executes fewer instructions (in particular, 8254 versus 9004 for the scalar version).

TABLE 4

```
J = 0;
x = 0;
jmp Loop1Tail;
Loop1:
    p1 = A[x] < K;
    jge Skip;
    j = A[x + j];
Skip:
    B[x] = j;
    ++x;
Loop1Tail:
    p0 = (x < 100);
    jlt Loop1;
```

TABLE 5

```
j = 0;
x = Index(0,1);
jmp Loop1Tail;
Loop1:
    p0: p1 = A[x] < K;
    r2 = ConditionalStopIndex (p1, MODE)
    p3 = 0;
    goto Loop2Tail;
Loop2:
    p3 = p3 & p0;
    p3: j = PropagatePrior (j)
    p4 = p1 & p3;
    p4: j = A[x + j];
Loop2Tail:
    p3 = GeneratePredicatesIndex (p3, r2);
    p0: if ANY(p3)) goto Loop2;
    p0:B[x] = j;
    x = x + VECLEN;
Loop1Tail:
    p0 = x < 100;
    Jne Loop1;
```

Figure 7:
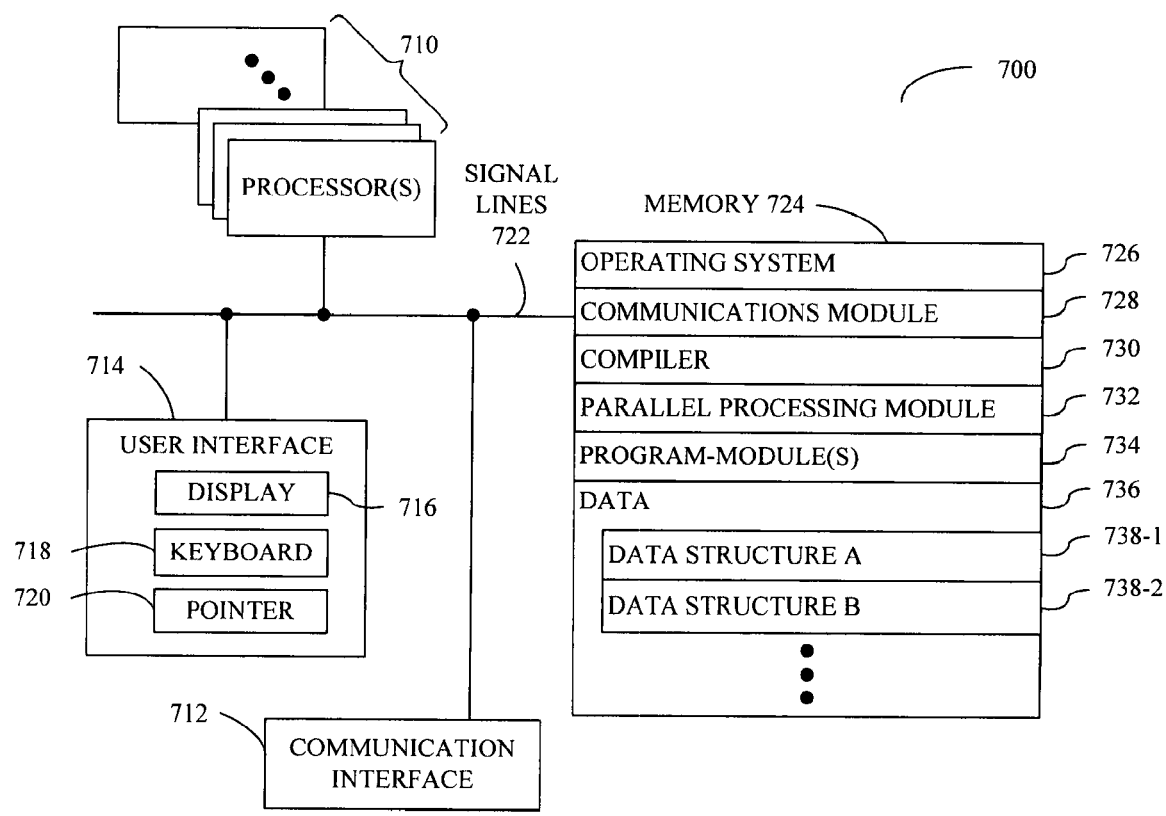
FIG. 7 is a block diagram illustrating a computer system in accordance with an embodiment of the present invention.

We now describe computer systems that include compilers that generate instructions based on a feature set of a processor. FIG. 7 presents a block diagram illustrating a computer system 700 in accordance with an embodiment of the present invention. Computer system 700 includes: one or more processors 710 or processor cores, a communication interface 712, a user interface 714, and one or more signal lines 722 coupling these components together. Note that the one or more processing units 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer 720, such as a mouse.

Memory 724 in the computer system 700 may include volatile memory and/or non-volatile memory. More specifically, memory 724 may include: ROM, RAM, EPROM, EEPROM, flash, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more computers and/or servers, including computers and/or servers that are remotely located with respect to the computer system 700.

Memory 724 may include a compiler module 730 (or a set of instructions) for generating instructions (such as one or more program modules 734) based on the feature set of the processors 710. These instructions may be distributed to the processors 710 for execution using parallel-processing module 732 (or a set of instructions).

Memory 724 may also include the program modules 734 (or a set of instructions). Furthermore, memory 724 may include data 736, such as data structures 738.

Instructions in the various modules in the memory 724 may be implemented in: a high-level procedural language, an object-oriented programming language, and/or in an assembly or machine language. Moreover, the programming language may be compiled or interpreted, i.e., configurable or configured to be executed by the one or more processing units 710.

Although the computer system 700 is illustrated as having a number of discrete items, FIG. 7 is intended to be a functional description of the various features that may be present in the computer system 700 rather than as a structural schematic of the embodiments described herein. In practice, and as recognized by those of ordinary skill in the art, the functions of the computer system 700 may be distributed over a large number of servers or computers, with various groups of the servers or computers performing particular subsets of the functions. In some embodiments, some or all of the functionality of the computer system 700 may be implemented in one or more application-specific integrated circuits (ASICs) and/or one or more digital signal processors (DSPs).

Computer system 700 may include fewer components or additional components. Moreover, two or more components may be combined into a single component and/or a position of one or more components may be changed. In some embodiments the functionality of the computer system 700 may be implemented more in hardware and less in software, or less in hardware and more in software, as is known in the art.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing parallel operations in a computer system when one or more conditional loop-carried dependencies may be present, wherein a given conditional loop-carried dependency includes a loop-carried dependency associated with at least two data elements based on a pair of conditions, comprising:
receiving program code generated by a compiler, wherein the program code includes instructions for generating a vector of tracked positions of actual loop-carried dependencies based on corresponding loop-carried dependencies identified by the compiler during a compilation operation;
while executing the program code, receiving the instructions for generating a vector of tracked positions of actual loop-carried dependencies, wherein a given tracked position indicates the position of a given actual loop-carried dependency that occurs based on values in data elements that were generated while executing the program code, and wherein the given actual loop-carried dependency occurs when the pair of conditions matches one or more criteria; and
executing the instructions for generating the vector of tracked positions.

2. The method of claim 1, wherein the at least two data elements are adjacent to each other in a vector of conditions.

3. The method of claim 1, wherein the one or more criteria include true-true, true-false, false-true or false-false pairings between elements.

4. The method of claim 1, wherein the loop-carried dependency includes another operation that is related to the at least two data elements.

5. The method of claim 4, wherein results of the other operation may be different when evaluated in parallel than when evaluated sequentially.

6. The method of claim 1, wherein the pair of conditions is associated with logical operations.

7. The method of claim 1, wherein the pair of conditions is determined by evaluating one or more true/false conditions.

8. The method of claim 1, wherein the given tracked position is associated with a change in the pair of conditions.

9. A compiler configured to generate instructions based on a feature set of a processor to perform parallel operations when one or more conditional loop-carried dependencies may be present, wherein a given conditional loop-carried dependency includes a loop-carried dependency associated with at least two data elements based on a pair of conditions, and wherein, during operation, the processor is configured to operate by:
receiving program code generated by the compiler, wherein the program code includes instructions for generating a vector of tracked positions of actual loop-carried dependencies based on corresponding loop-carried dependencies identified by the compiler during a compilation operation;
while executing the program code, receiving the instructions for generating a vector of tracked positions of actual loop-carried dependencies, wherein a given tracked position indicates the position of a given actual loop-carried dependency that chat occurs based on values in data elements that were generated while executing the program code, and wherein the given actual loop-carried dependency occurs when the pair of conditions matches one or more criteria; and
executing the instructions for generating the vector of tracked positions.

10. The compiler of claim 9, wherein the at least two data elements are adjacent to each other in a vector of conditions.

11. The compiler of claim 9, wherein the one or more criteria include true-true, true-false, false-true or false-false pairings between elements.

12. The compiler of claim 9, wherein the loop-carried dependency includes another operation that is related to the at least two data elements.

13. The compiler of claim 12, wherein results of the other operation may be different when evaluated in parallel than when evaluated sequentially.

14. The compiler of claim 9, wherein the pair of conditions is associated with logical operations.

15. The compiler of claim 9, wherein the pair of conditions is determined by evaluating one or more true/false conditions.

16. The compiler of claim 9, wherein the given tacked position is associated with a change in the pair of conditions.

17. A computer system configured to execute instructions to perform parallel operations when one or more conditional loop-carried dependencies may be present, wherein a given conditional loop-carried dependency includes a loop-carried dependency associated with at least two data elements based on a pair of conditions, comprising:
a processor;
a memory that contains program code generated by a compiler, wherein the program code includes instructions for generating a vector of tracked positions of actual loop-carried dependencies based on corresponding loop-carried dependencies identified by the compiler during a compilation operation;
an instruction fetch unit within the processor configured to, while executing the program code, fetch instructions from the program code, comprising:
instructions for receiving the instructions for generating a vector of tracked positions of actual loop-carried dependencies, wherein a given tracked position indicates the position of a given actual loop-carried dependency that occurs based on values in data elements that were generated while executing the program code, and wherein the given actual loop-carried dependency occurs when the pair of conditions matches one or more criteria; and
instructions for executing the instructions for generating the vector of tracked positions.

18. The computer system of claim 17, wherein the at least two data elements are adjacent to each other in a vector of conditions.

19. The computer system of claim 17, wherein the one or more criteria include true-true, true-false, false-true or false-false pairings between elements.

20. The computer system of claim 17, wherein the loop-carried dependency includes another operation that is related to the at least two data elements.

21. The computer system of claim 20, wherein results of the other operation may be different when evaluated in parallel than when evaluated sequentially.

22. The computer system of claim 17, wherein the pair of conditions is associated with logical operations.

23. The computer system of claim 17, wherein the pair of conditions is determined by evaluating one or more true/false conditions.

24. The computer system of claim 17, wherein the given tracked position is associated with a change in the pair of conditions.

* * * * *